United States Patent [19]
Moore, Jr. et al.

[11] Patent Number: 6,024,175
[45] Date of Patent: Feb. 15, 2000

[54] AUTOMATIC SEALING SPRINKLER HEAD ADAPTER AND FIRE PROTECTION SPRINKLER SYSTEM

[76] Inventors: Fred D. Moore, Jr., 155 Hunt Dr., Horsham, Pa. 19044; Robert L. Conneen, 794 Bradford Ter., Springfield, Pa. 19064; Charles M. Kruger, Jr., 444 Sunny Ridge Rd., Gilbertsville, Pa. 19525

[21] Appl. No.: 09/062,242

[22] Filed: Apr. 17, 1998

[51] Int. Cl.⁷ .............................. A62C 37/08; B05B 1/30
[52] U.S. Cl. ............................................. 169/37; 239/579
[58] Field of Search ....................... 169/37, 16; 239/569, 239/579; 251/149.6

[56] References Cited

U.S. PATENT DOCUMENTS

| | | | |
|---|---|---|---|
| 629,304 | 7/1899 | Rawlins | 137/329.2 |
| 951,519 | 3/1910 | Bacigalupi | 251/149.6 X |
| 1,268,160 | 6/1918 | Sammons | 137/329.2 |
| 1,432,386 | 10/1922 | Curney . | |
| 1,740,015 | 12/1929 | Hooper et al. | 251/149.6 |
| 1,762,503 | 6/1930 | Buckner | 251/149.6 X |
| 1,855,264 | 4/1932 | Thompson | 239/569 X |
| 1,875,780 | 9/1932 | Thompson | 239/569 X |
| 3,750,954 | 8/1973 | Williams | 239/178 |
| 4,562,962 | 1/1986 | Hartman | 239/569 X |
| 4,736,889 | 4/1988 | Stephenson | 239/204 |
| 4,848,661 | 7/1989 | Palmer et al. | 239/204 |
| 5,109,929 | 5/1992 | Spears | 169/16 |
| 5,174,500 | 12/1992 | Yianilos . | |
| 5,524,824 | 6/1996 | Frimmer | 239/569 X |
| 5,533,576 | 7/1996 | Mears | 169/90 |
| 5,577,706 | 11/1996 | King | 251/149.6 |
| 5,628,340 | 5/1997 | Huang | 137/329.2 |

*Primary Examiner*—Lesley D. Morris
*Attorney, Agent, or Firm*—Michael F. Petock, Esq.

[57] ABSTRACT

A sprinkler head adapter for use in a fire protection sprinkler system and a fire protection sprinkler system enable fire retardant fluid flow from the fire protection sprinkler system only when a sprinkler head is inserted into the sprinkler head adapter. When the sprinkler head is removed or unscrewed from the sprinkler head adapter, a valve contained within the sprinkler head adapter automatically closes. In a preferred embodiment, the valve comprises a valve sealing member connected to a sprinkler head sensing member and a biasing member for biasing the valve sealing member to a closed position. The sprinkler head sensing member holds the valve sealing member in the open condition when the sprinkler head is sensed by the sprinkler head sensing member to be in the adapter. The biasing member may be a coil spring.

10 Claims, 2 Drawing Sheets

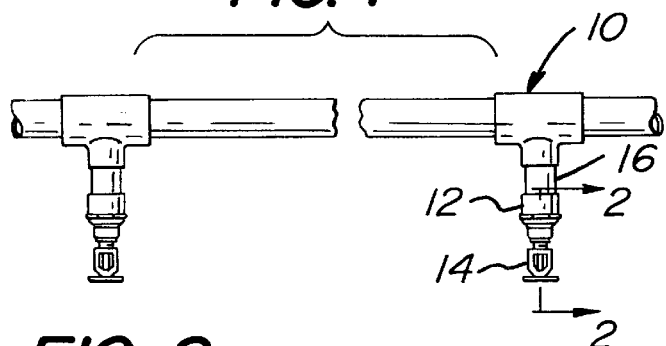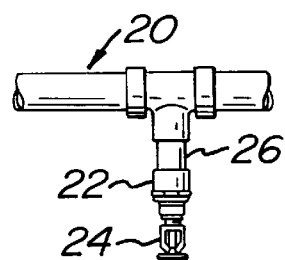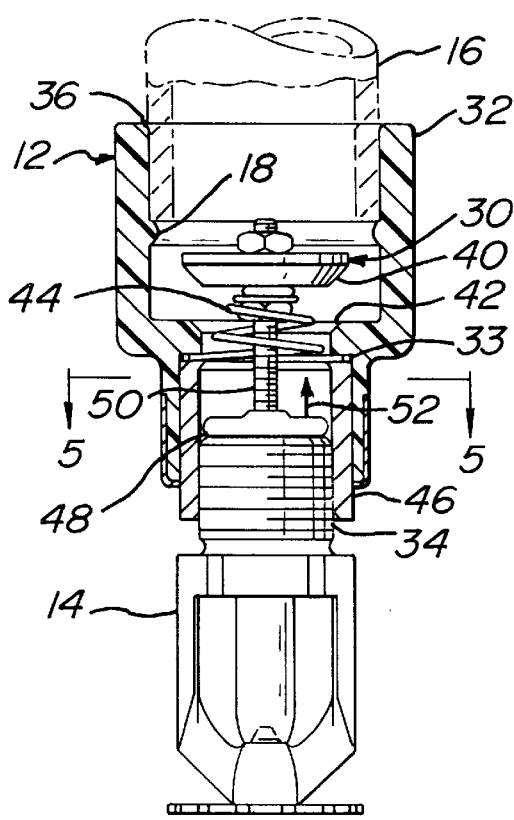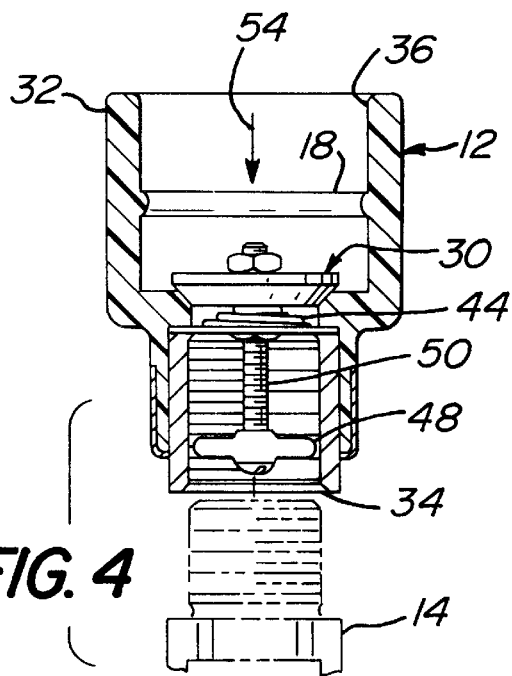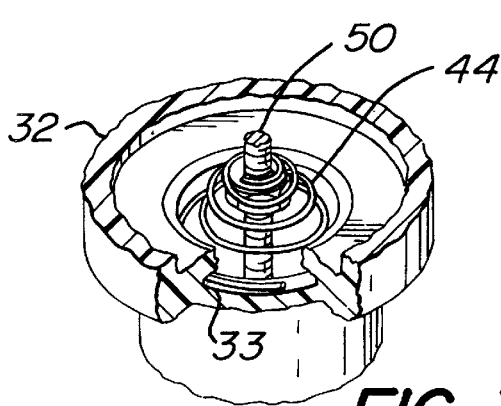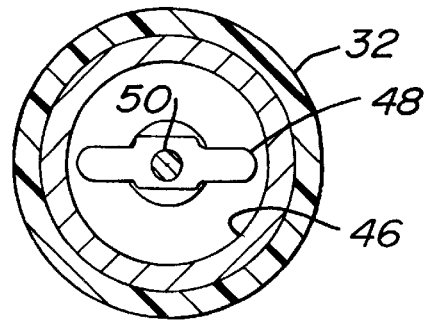

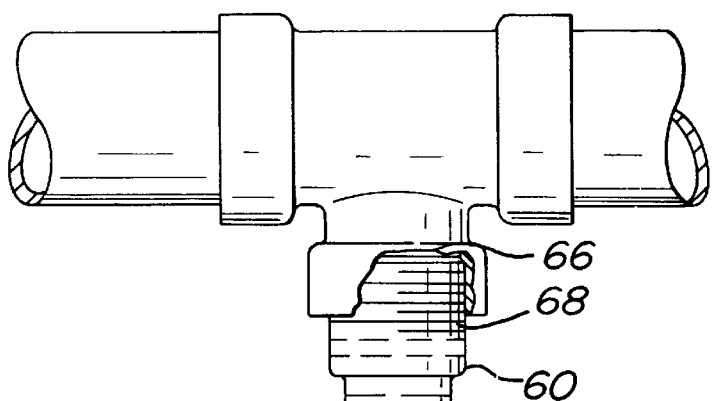
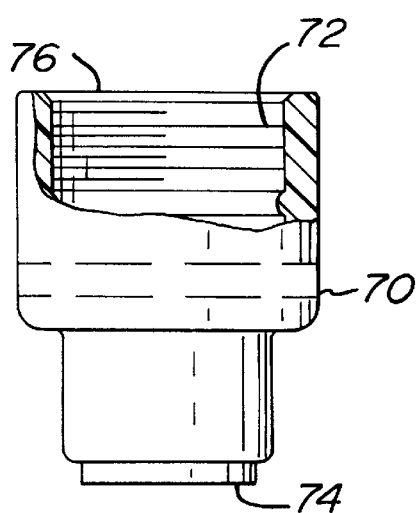
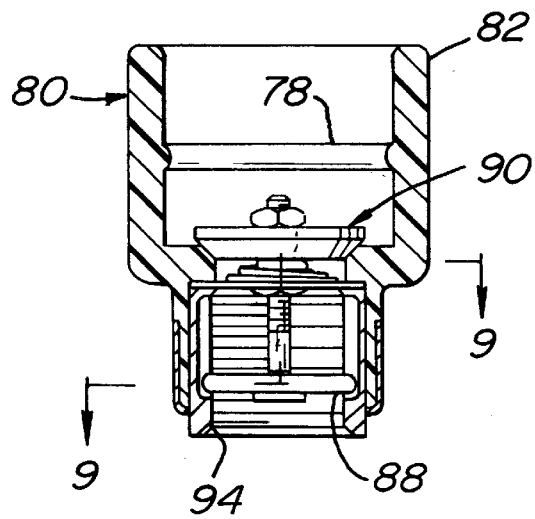
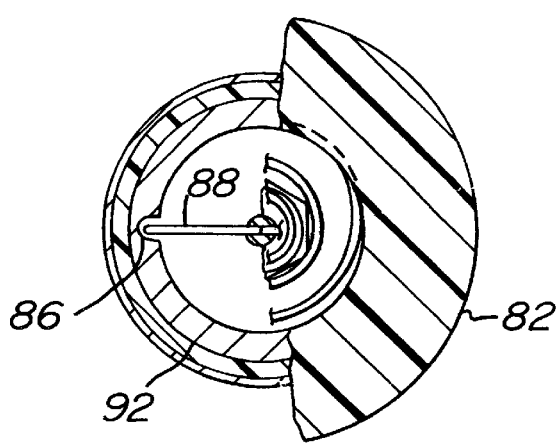

AUTOMATIC SEALING SPRINKLER HEAD ADAPTER AND FIRE PROTECTION SPRINKLER SYSTEM

FIELD OF THE INVENTION

The present invention relates to an automatic sealing sprinkler head adapter and fire protection sprinkler system. More particularly, the present invention is directed to a sprinkler head adapter and the resulting fire protection sprinkler system wherein the fire protection system is automatically sealed from flow or leakage of fire retardant fluid when the sprinkler head is removed from the sprinkler head adapter.

BACKGROUND OF THE INVENTION

Fire protection sprinkler systems have now become very common as a means to protect buildings and other property from fire. Fire protection systems are often utilized in offices, warehouses, hotels, office buildings, and now are being utilized commonly in residences, particularly in cases of new construction. It is not uncommon that a sprinkler head needs to be removed and replaced due to leakage or other defect. Prior to the present invention, it was necessary to drain the system of fire retardant fluid, which is usually water with antifreeze under pressure, remove and replace the sprinkler head, and then recharge the system with appropriate fire retardant fluid. This usually required several man hours to perform.

The present invention overcomes the cost and inconvenience of having to drain the fire protection system and recharge the system whenever a sprinkler head needs to be removed.

SUMMARY OF THE INVENTION

One of the advantages of the present invention is that it avoids the need to drain and recharge a fire protection system with fire retardant fluid whenever a sprinkler head must be removed for replacement or other reasons.

Another advantage of the present invention is that it is economical and effective to solve the long standing problem of having to drain and recharge the fire protection system.

Another advantage of the present invention is that it does not require any significant change in layout or dimensions of the fire protection sprinkler system.

Briefly and basically, in accordance with the present invention, a sprinkler head adapter for use in a fire protection sprinkler system uses a valve mounted within the housing of the sprinkler head adapter. The housing of the sprinkler head adapter is provided with a first opening for receiving the sprinkler head and a second opening which connects to the fire protection sprinkler system. The valve is maintained in an open condition enabling fluid flow from the fire protection sprinkler system via the second opening to the first opening when the sprinkler head is received within the sprinkler head adapter and is automatically closed when the sprinkler head is removed.

In a presently preferred embodiment, the valve comprises a valve sealing member connected to a sprinkler head sensing member and a biasing member for biasing the valve seating member to a closed position. The sprinkler head sensing member holds the valve sealing member in the open condition when the sprinkler head is sensed by the sprinkler head sensing member. The invention is also directed to the fire protection sprinkler system enabled by use of the sprinkler head adapter wherein a valve is contained in the sprinkler head adapter which is normally biased to the closed position and held in the open position by the presence of the sprinkler head in the sprinkler head adapter.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is an elevation view of a fire protection sprinkler system in accordance with the present invention constructed utilizing plastic pipe.

FIG. 1A is an elevation view of a fire protection sprinkler system in accordance with the present invention utilizing metal pipe.

FIG. 2 is a cross sectional view taken along line 2—2 of FIG. 1 illustrating the valve of the sprinkler head adapter held in the open condition by the sprinkler head.

FIG. 3 is a broken away view of the sprinkler head adapter of FIG. 2 illustrating the biasing member or spring for the valve.

FIG. 4 is a cross sectional view of a sprinkler head adapter with the valve in the closed condition with the sprinkler head removed from the sprinkler head adapter.

FIG. 5 is a cross sectional view taken along line 5—5 of FIG. 2.

FIG. 6 is an elevation view, partially broken away of another embodiment of a sprinkler head adapter provided with external threads (male).

FIG. 7 is a broken away view of another embodiment of a sprinkler head adapter in accordance with the present invention utilizing internal threads (female) for connection to the remainder of the fire protection sprinkler system.

FIG. 8 is a cross sectional view of another embodiment of a sprinkler head adapter in accordance with the present invention.

FIG. 9 is a cross sectional view taken along line 9—9 of FIG. 8.

DETAILED DESCRIPTION OF THE PREFERRED EMBODIMENTS

Referring now to the drawings, wherein like numerals indicate like elements, there is shown in FIG. 1 a fire protection sprinkler system 10 provided with a sprinkler head adapter 12 and a sprinkler head 14. The sprinkler head adapter 12 is connected to the fire protection sprinkler system 10 via pipe 16. The fire protection sprinkler system 10 of FIG. 1 is illustrated as being constructed of plastic pipe, which is currently commonly used.

FIG. 1A illustrates a similar fire protection sprinkler system 20 constructed of metal pipe. Fire protection sprinkler system 20 also includes a sprinkler head adapter 22 and a sprinkler head 24 screwed into adapter 22. Sprinkler head adapter 22 is connected to the remainder of the fire protection sprinkler system via pipe 26.

Referring now more particularly to FIGS. 2 through 5, there is shown in FIG. 2 the sprinkler head adapter 12 mounted to pipe 16. Sprinkler head adapter 12 is provided with a stop 18 which limits the degree of insertion of pipe 16 into adapter 12. This prevents pipe 16 from being inserted to a point where it or the glue or solvent could interfere with the operation of valve 30.

Valve 30 is mounted in housing 32 of sprinkler head adapter 12 between a first opening 34 for receiving sprinkler head 14 and a second opening 36 which receives or connects to pipe 16 of the fire protection sprinkler system.

Valve 30 is shown in the open condition in FIG. 2 and in the closed condition in FIG. 4. Valve 30 is comprised of valve sealing member 40 which mates with valve seat 42 when valve 30 is closed as illustrated in FIG. 4. Valve sealing member 40 is normally biased in the closed condition by biasing member or coil spring 44. It is understood that other forms of biasing members may be utilized other than a coil spring and that the biasing member could be arranged in other manners. As presently illustrated in the preferred embodiment, coil spring 44 is mounted between valve sealing member 40 and the housing 32 of the sprinkler head adapter 12. As specifically illustrated, the lower end of coil spring 44 is mounted between housing 32 (at 33) and a metal insertion member 46 which is commonly utilized to receive the threaded male end of sprinkler head 14. In the presently preferred embodiment, biasing member or coil spring 44 is normally in a retracted condition as illustrated in FIG. 4 and is extended against the inherent resiliency of the spring to the condition as illustrated in FIG. 2 when sprinkler head 14 is inserted into opening 34.

In a presently preferred embodiment as illustrated, valve sealing member 40 is connected to transverse member 48 via rod 50. Transverse member 48 functions as a sprinkler head sensing member and senses that the sprinkler 14 is inserted into first opening 34. In other words, when the male threaded end of sprinkler head 14 is screwed into metal insertion member 46 which forms the first opening, transverse member 48 is forced in the direction of arrow 52 forcing valve sealing member 40 in the same direction causing valve 30 to open and be held in the open condition as illustrated in FIG. 2. When valve head 14 is unscrewed from first opening 34 as illustrated in FIG. 4, transverse member 14 moves in the direction of arrow 54 causing the closure of valve 30 as illustrated in FIG. 4.

In operation, when a sprinkler head 14 is screwed into or received in first opening 34 of sprinkler head adapter 12, valve 30 is held in its open condition against the force of biasing member or spring 44 as illustrated in FIG. 2. Should it become necessary to remove the sprinkler head 14, this may be done without draining the fire protection system. As head 14 is unscrewed from first opening 34, valve 30 automatically closes by reason of the force of biasing member or spring 44 as shown in FIG. 4. In this manner, sprinkler head 14 may be removed without draining the system and without fire retardant fluid being lost from the fire protection system and damaging the interior of the fire protected building or other location. When a new sprinkler head is screwed into or received in first opening 34, this automatically forces transverse member 48, rod 50 and valve sealing member 44 to move in the direction of arrow 52 reopening valve 30 to its original operating condition as illustrated in FIG. 2. In this manner, substantial efficiency, saving in man hours and materials and convenience may be achieved in replacing a sprinkler head utilizing the present invention.

It is contemplated within the scope of the present invention that other forms of valves, biasing and sensing means may be utilized to practice the present invention, but a presently preferred embodiment is illustrated in FIGS. 1 through 5. It would be apparent to those skilled in the art that, with some elongation of housing 32, that a compression spring could be mounted above valve sealing member 40 to a transverse bar mounted in proximity to the second opening 36. It is also apparent that other variations may be utilized in connection with the form of the housing including shape and internal and external threading.

FIG. 6 illustrates a sprinkler head adapter 60 having a valve as described with respect to FIGS. 2–5 and a sprinkler head 62 received in a first opening 64. The sprinkler head adapter 60 is provided with external threads 68 in proximity to its second opening 66 which may be utilized to mount into a female fitting in a fire protection sprinkler system.

FIG. 7 illustrates a sprinkler head adapter 70 having internal thread 72 on its second opening 76. A sprinkler head would be mounted into its first opening 74.

The embodiments of FIGS. 6 and 7 illustrate use primarily in connection with metal pipe, although such threading could be utilized with pipe of any composition assuming suitable structural material to support such threading.

Referring now to FIGS. 8 and 9, there is shown another embodiment of a sprinkler head adapter 80 having a housing 82, a pipe stop 78 and a valve 90. The structure and operation of the sprinkler head adapter 80 is substantially identical to that described and illustrated with respect to sprinkler head adapter 12 with the exception that transverse member 88 is somewhat longer and rides in a groove or guide 86 formed within metal insert 92 of first opening 94. The groove 86, as may be seen in FIG. 8 does not extend to the lower end of metal insert 92 to prevent leakage of fire retardant fluid.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. A sprinkler head adapter for use in a fire protection sprinkler system, comprising:

a housing, said housing being adapted to receive in a first opening a sprinkler head and being adapted to connect to a fire protection sprinkler system via a second opening;

a valve within said housing between said first and second openings;

said valve being maintained in an open condition enabling fluid flow from said fire protection sprinkler system via said second opening to said first opening when said sprinkler head is received within said first opening and said valve being closed when said sprinkler head is removed from said first opening;

wherein said valve comprises a valve sealing member connected to a sprinkler head sensing member, a biasing member for biasing said valve sealing member to a closed position, said biasing member being a coil spring which is extended when the sprinkler head is inserted in said first opening; and said sprinkler head sensing member holding said valve sealing member in said open condition when said sprinkler head is sensed by said sprinkler head sensing member to be received in said first opening.

2. A fire protection sprinkler system wherein at least one sprinkler head adapter apparatus as set forth in claim 1 is mounted between a fire sprinkler head and a piping system carrying a fire retardant fluid under pressure.

3. A sprinkler head adapter in accordance with claim 1 wherein said housing is comprised of metal.

4. A sprinkler head adapter for use in a fire protection sprinkler system, comprising:

a housing, said housing being adapted to receive in a first opening a sprinkler head and being adapted to connect to a fire protection sprinkler system via a second opening;

a valve within said housing between said first and second openings;

said valve being maintained in an open condition enabling fluid flow from said fire protection sprinkler system via said second opening to said first opening when said sprinkler head is received within said first opening and said valve being closed when said sprinkler head is removed from said first opening;

wherein said valve comprises a valve sealing member connected to a sprinkler head sensing member, a biasing member for biasing said valve sealing member to a closed position and said sprinkler head sensing member holding said valve sealing member in said open condition when said sprinkler head is sensed by said sprinkler head sensing member to be received in said first opening; and wherein said housing is comprised of plastic and said second opening is provided with a stop to limit the extent of insertion of a pipe from said sprinkler system.

5. A sprinkler head adapter for use in a fire protection sprinkler system, comprising:

a housing, said housing being adapted to receive in a first opening a sprinkler head and being adapted to connect to a fire protection sprinkler system via a second opening;

a valve within said housing between said first and second openings;

said valve being maintained in an open condition enabling fluid flow from said fire protection sprinkler system via said second opening to said first opening when said sprinkler head is received within said first opening and said valve being closed when said sprinkler head is removed from said first opening;

wherein said valve comprises a valve sealing member connected to a sprinkler head sensing member, a biasing member for biasing said valve sealing member to a closed position and said sprinkler head sensing member holding said valve sealing member in said open condition when said sprinkler head is sensed by said sprinkler head sensing member to be received in said first opening; and wherein said first opening for receiving said sprinkler head is internally threaded.

6. A sprinkler head adapter for use in a fire protection sprinkler system, comprising:

a housing, said housing being adapted to receive in a first opening a sprinkler head and being adapted to connect to a fire protection sprinkler system via a second opening;

a valve within said housing between said first and second openings;

said valve being maintained in an open condition enabling fluid flow from said fire protection sprinkler system via said second opening to said first opening when said sprinkler head is received within said first opening and said valve being closed when said sprinkler head is removed from said first opening;

wherein said valve comprises a valve sealing member connected to a sprinkler head sensing member, a biasing member for biasing said valve sealing member to a closed position and said sprinkler head sensing member holding said valve sealing member in said open condition when said sprinkler head is sensed by said sprinkler head sensing member to be received in said first opening;

wherein said biasing member is comprised of a spring member connected between said valve sealing member and said housing.

7. A sprinkler head adapter for use in a fire protection sprinkler system, comprising:

a housing, said housing being adapted to receive in a first opening a sprinkler head and being adapted to connect to a fire protection sprinkler system via a second opening;

a valve within said housing between said first and second openings;

said valve being maintained in an open condition enabling fluid flow from said fire protection sprinkler system via said second opening to said first opening when said sprinkler head is received within said first opening and said valve being closed when said sprinkler head is removed from said first opening;

wherein said valve comprises a valve sealing member connected to a sprinkler head sensing member, a biasing member for biasing said valve sealing member to a closed position and said sprinkler head sensing member holding said valve sealing member in said open condition when said sprinkler head is sensed by said sprinkler head sensing member to be received in said first opening; and wherein said sprinkler head sensing member is comprised of a transverse member mounted on a rod, said rod being connected to said valve sealing member, said traverse member being contacted by the male threaded end of a sprinkler head when the sprinkler head is inserted into said first opening.

8. A sprinkler head adapter for use in a fire protection sprinkler system, comprising:

a housing, said housing being adapted to receive in a first opening a sprinkler head and being adapted to connect to a fire protection sprinkler system via a second opening;

a valve within said housing between said first and second openings;

said valve being maintained in an open condition enabling fluid flow from said fire protection sprinkler system via said second opening to said first opening when said sprinkler head is received within said first opening and said valve being closed when said sprinkler head is removed from said first opening;

wherein said valve comprises a valve sealing member connected to a sprinkler head sensing member, a biasing member for biasing said valve sealing member to a closed position and said sprinkler head sensing member holding said valve sealing member in said open condition when said sprinkler head is sensed by said sprinkler head sensing member to be received in said first opening; and wherein said second opening is internally threaded.

9. A sprinkler head adapter for use in a fire protection sprinkler system, comprising:

a housing, said housing being adapted to receive in a first opening a sprinkler head and being adapted to connect to a fire protection sprinkler system via a second opening;

a valve within said housing between said first and second openings;

said valve being maintained in an open condition enabling fluid flow from said fire protection sprinkler system via said second opening to said first opening when said sprinkler head is received within said first opening and said valve being closed when said sprinkler head is removed from said first opening; and wherein said valve comprises a valve sealing member connected to a sprinkler head sensing member, a biasing member for biasing said valve sealing member to a closed position and said sprinkler head sensing member holding said valve sealing member in said open condition when said sprinkler head is sensed by said sprinkler head sensing member to be received in said first opening wherein said second opening is provided with external threads.

10. A fire protection sprinkler system, comprising;

piping for delivering a fire retardant fluid under pressure terminating in a plurality of sprinkler head adapters;

each sprinkler head adapter containing therein a valve;

said valve in each of said sprinkler head adapters being maintained in an open condition when a sprinkler head is received within said sprinkler head adapter and said valve automatically closing when said sprinkler head is removed from said adapter;

wherein said valve comprises a valve sealing member connected to a sprinkler head sensing member, a biasing member for biasing said valve sealing member to a closed position, said biasing member being a coil spring which is extended when said sprinkler head is inserted into said adapter; and said sprinkler head sensing member holding said valve sealing member in said open condition when said sprinkler head is sensed by said sprinkler head sensing member to be received in said opening.

* * * * *